United States Patent Office 3,381,049
Patented Apr. 30, 1968

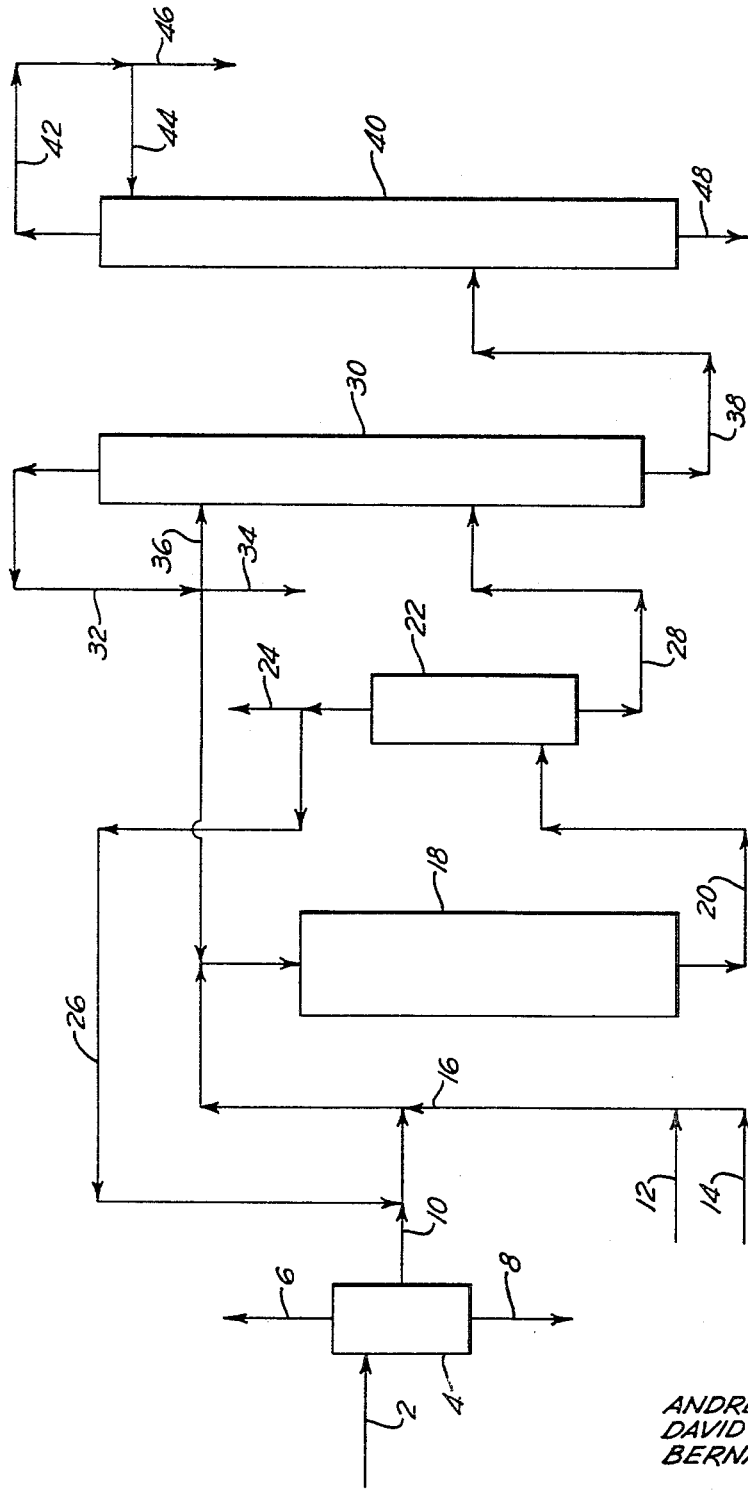

3,381,049
PREPARATION OF A LOW ACID
WASH COLOR CUMENE
Andrew Alexander, Swarthmore, David H. Jack, East Lansdowne, and Bernard A. Kreiter, Media, Pa., assignors to Gulf Oil Corporation, Pittsburgh, Pa., a corporation of Pennsylvania
Filed Feb. 18, 1965, Ser. No. 433,611
10 Claims. (Cl. 260—671)

ABSTRACT OF THE DISCLOSURE

A low acid wash color cumene is prepared from a propylene stream containing at least about 0.1 percent by weight of butylenes. The propylene is initially treated to reduce the butylene content to below 0.1 percent by weight. Benzene is then alkylated with a low butylene content propylene using a phosphoric acid catalyst. The cumene is separated from the butylene benzene product by distillation.

---

This invention relates to a process for preparing cumene, particularly cumene acceptable for conversion to phenol and acetone.

Benzene can be alkylated with propylene, preferably in the presence of an inert diluene, such as propane, to form cumene. Thus, a mixture of benzene, propylene and propane can be passed over a suitable catalyst, such as phosphoric acid on kieselguhr, wherein, for example, the amount of phosphoric acid on kieselguhr can be from about 50 to about 90 percent by weight thereof, at a space velocity (volume of combined charge/volume of catalyst/hour) of about 0.5 to about 2.0 while maintaining a temperature of about 350° to about 450° F. and a pressure of about 300 to about 700 pounds per square inch gauge in the reaction system, to obtain cumene.

The olefinic stream containing propylene for reaction with benzene can be obtained from any source, for example, as a result of the cracking or dehydrogenation of petroleum products. A typical product that can be employed could contain the following compounds in the following amounts.

| Component: | Percent by wt. |
|---|---|
| Ethane | 0.5–3.0 |
| Ethylene | 0.1–0.5 |
| Propane | 30–35 |
| Propylene | 50–65 |
| Butane | 1.0–5.0 |
| Butylenes | 0.1–1.0 |

The inert hydrocarbons, ethane, propane and/or butane, can be left in the stream, since they have a tendency to control the activity and/or selectivity of the phosphoric acid catalyst. The separation of ethylene and butylenes from the gas stream, along with the corresponding ethane and butane, respectively, could also be effected if desired before the stream is brought into contact with benzene in the presence of a phosphoric acid catalyst to form cumene. In the event the ethylene and the butylenes were left in the stream during the alkylation stage, however, it would be expected that, at most, they would merely alkylate the benzene and form the corresponding alkyl benzenes. While this would result in the consumption of a small amount of benzene and the subsequent removal of the undesired alkyl benzenes from the desired cumene woud be required, such procedure would not be expected to present insurmountable problems.

We have found, however, for some reason we do not completely understand, that the amount of butyl benzenes present in the alkylation reaction product is greater than the amount that would be predicted if all of the butylenes in the charge were to react with the benzene. Thus, even if the charge to the alkylation reactor were substantially completely free of butylenes, the alkylation product would still contain some butyl benzenes. Accordingly, since the alkylation product in any event will have to be treated to remove butyl benzenes therefrom during the recovery of the desired cumene, it would appear that the treatment of the charge of the alkylation reactor to remove butylenes therefrom would not be required since such treatment would represent a duplication of effort.

We have found, however, that in the process defined and claimed herein, not only may it be necessary to treat the cumene product to remove butyl benzenes therefrom but that it is necessary to treat the olefinic feed prior to alkylation to remove substantially all of the butylenes therefrom, or in any event restrict the content of the butylenes in the olefinic feed to less than about 0.1 percent by weight, based on the total olefinic feed, preferably to about 0.02 to about 0.1 percent by weight.

A particularly important use for cumene resides in the preparation of phenol and acetone. Thus, cumene can be subjected to oxidation with a gas containing molecular oxygen at a temperature of about 30° to about 100° C. and a pressure of about 0.5 to about 50 pounds per square inch gauge for a time such that about 20 to about 30 percent by weight thereof is converted to cumene hydroperoxide, the entire oxidation mixture thus obtained, or only the cumene hydroperoxide in said mixture, is then treated with an acid catalyst, such as aqueous sulfuric acid having a concentration of about 10 to about 95 percent, to decompose the same to obtain a crude mixture containing phenol and acetone, and thereafter the crude mixture is subjected to separation and purification procedures to recover separately phenol and acetone.

As noted, the butyl benzenes can easily be removed from the cumene product. However, even if they were not removed they would not adversely affect the course of the defined oxidation reaction. We have found, though, that in the event butylenes are not removed from the olefinic charge to the alkylation reactor, and the amount thereof is permitted to remain in excess of about 0.1 percent by weight, the acid wash color of the cumene obtained even if the cumene is treated to remove butyl benzenes therefrom, is in excess of about one and therefore is undesirable for oxidation to produce phenol and acetone.

Acid wash color is considered to be an indication of the amount of olefinic impurity in the cumene. Olefinic impurities in the cumene are undesirable, since they have a tendency to inhibit the oxidation of cumene to cumene hydroperoxide. While it would appear that if the cumene thus obtained could be made acceptable for oxidation by the mere expedient of removing the olefinic impurity from the cumene, thereby obtaining an acceptable acid wash color, we have noted that especially one of the impurities present boils substantially at the same level as the cumene. While we are not certain, we believe that the impurity present in the cumene is a $C_{10}$ olefinic polymer that results from a polymerization of two mols of propylene with one mol of a butylene. By maintaining the butylene content of the olefinic feed to below about 0.1 percent by weight, we believe we can avoid the formation of the defined $C_{10}$ olefinic polymer and thereby obtain a cumene product having an acid wash color of about one or less and thereby make the same suitable as charge for the desired production of phenol and acetone. The original olefinic stream defined previously can, in some instances, contain propadiene in an amount of about 10 to about 100 parts per million by weight. Propadiene can react with benzene to form alpha methyl styrene. The latter compound is also an undesired impurity. We have found that by maintaining the butylene content of the olefinic charge below about 0.1 percent by weight, the propadiene content thereof is also lowered and substantally eliminated. Thus, precise inspections of propane-propylene streams containing less than 0.1 percent by weight of butylenes show that the propadiene content to be less than five parts per million. Otherwise, when the propanepropylene charge contained about 0.4 percent by weight of butylene, a propadiene content of 50 parts per million was found.

The process defined and claimed herein can further be illustrated by reference to the accompanying drawing wherein a propane-propylene feed stream containing from about 50 to about 65 percent by weight of propylene, about 30 to about 35 percent by weight of propane, about 0.1 to about 0.5 percent by weight of ethylene, about 0.5 to about 3.0 percent by weight of ethane, about 1.0 to about 5.0 percent by weight of butanes, about 0.1 to about 1.0 percent by weight of butylenes, about 10 to about 100 parts per million by weight of propadiene, etc., is passed by line 2 into fractionator 4 wherein, by any suitable means, the butylene content of the feed is reduced to at least about 0.1 percent by weight, preferably less than about 0.2 to about 0.05 percent by weight. Fractionator 2 can be operated, for example, at a temperature of about 115° to about 135° F. and a pressure of about 200 to about 250 pounds per square inch gauge. Ethane, ethylene and lighter can be removed overhead from fractionator 4 by line 6, while butylenes, butanes, propadiene and heavier can be removed from the base thereof by line 8.

The olefinic stream removed from fractionator 4 by line 10 can contain from about 55 to about 70 percent by weight of propylene, about 30 to about 45 percent by weight of propane, less than about 0.1 percent by weight of ethylene, about 0.5 percent by weight of ethane, about 0.3 percent by weight of butanes, less than about 0.1 percent by weight of butylenes, less than about five parts per million by weight of propadiene, etc. About 1500 to about 2000 percent by weight of benzene is introduced into the system by line 12 and by line 14 about 0.1 to about 0.3 percent by weight of water, each based on the amount of propylene introduced into the system. Water is employed to control the hydration level of the phosphoric acid catalyst.

The benzene and water are combind in line 16, and together with the olefinic feed in line 10 are introduced into alkylation reactor 18 containing a suitable catalyst, such as phosphoric acid on kieselguhr, wherein, for example, the amount of phosphoric acid on kieselguhr can be from about 50 to about 90 percent by weight thereof. The combined mixture is passed through alkylation reactor 18 at a space velocity (volume of combined charge/volume of catalyst/hour) of about 0.5 to about 2.0 while maintaining a temperature of about 350° to about 450° F. and a pressure of about 300 to about 700 pounds per square inch gauge therein.

The resulting alkylation mixture is removed from the base of alkylation reactor 18 by line 20 and passed into tower 22 wherein a temperature of about 415° to about 430° F. and a pressure of about 225 to about 250 pounds per square inch gauge are maintained. Propane and ethane are removed overhead from tower 22, and some is recycled to line 10 by line 26.

The remainder of the alkylation product in tower 22 is removed from the base thereof by line 28 and introduced into tower 30 wherein a tower bottoms temperature of about 340° to about 360° F. and a pressure of about five to about 10 pounds per square inch gauge are maintained. Benzene is removed overhead from tower 30 by line 32 and a portion thereof is removed from the system by line 34, another portion is returned as reflux to tower 30 by line 36 and the remainder is recycled to line 16.

The remainder of the product in tower 30 is removed from the base thereof by line 38 and passed into tower 40 wherein there is maintained a tower bottoms temperature of about 350° to about 375° F. and a pressure of about 10 to about 15 pounds per square inch gauge. The desired cumene product is removed from the top of tower 40 by line 42 and a portion thereof is returned as reflux by line 44 to tower 40. The remainder as desired cumene is removed from the system by line 46. Butyl benzenes, ethyl cumene, diisopropyl benzene, hexyl benzene, triethyl benzene and heavy olefinic polymers are removed from the base of tower 40 by line 48.

The process defined herein can further be understood by reference to the following:

Example I

Several runs were made wherein a propane-propylene stream containing propane, propylene about 0.2 percent by weight of water and varying amounts of butylenes was passed through a reactor containing kieselguhr on which there was present 80 percent by weight of phosphoric acid at a space velocity of 0.7, a temperature of 385° to 450° F. and a pressure of 500 pounds per square inch gauge. The results are tabulated below in Table I.

TABLE I

| Period | Propane-Propylene | | | | Benzene | | | Ratio Barrels Benzene/ Barrels Propylene | Cumene | | | | Cumene Tower Bottoms | |
|---|---|---|---|---|---|---|---|---|---|---|---|---|---|---|
| | Fresh | Barrels/Hour | | Butylenes, wt. Percent | Fresh | Barrels/Hour | | | Barrels/ Hour | Butyl Benzene, wt. Percent | Acid Wash Color (ASTM D 343) | Bromine Index (ASTM D1491-60) | Barrels/ Hour | Butyl wt. Percent |
| | | Recycle | Total | | | Recycle | Total | | | | | | | |
| 1 | 46 | 14 | 60 | 0.8 | 43 | 395 | 438 | 14.6 | 46.5 | 0.01 | 2− | 49.0 | 2.42 | |
| 2 | 46 | 18 | 64 | 0.4 | 52 | 392 | 444 | 13.9 | 47.0 | TR | 1+(X) | | 2.67 | |
| 3 | 46 | 15 | 61 | 0.3 | 56 | 399 | 455 | 14.9 | 49.6 | TR | 2−(X) | 78.6 | 4.42 | |
| 4 | 46 | 14 | 60 | 0.3 | 48 | 392 | 440 | 14.7 | 45.1 | TR | 1+(X) | 53.8 | 4.75 | |
| 5 | 62 | 20 | 82 | 0.2 | 59 | 465 | 524 | 12.8 | 57.2 | TR | 2(X) | 63.5 | 3.25 | |
| 6 | 46 | 15 | 61 | 0.2 | 63 | 336 | 399 | 13.1 | 43.6 | TR | 1+(X) | 81.8 | 4.88 | |
| 7 | 81 | 26 | 107 | 0.1 | 67 | 665 | 732 | 13.7 | 86.4 | 0.02 | 1(X) | 41.6 | 5.96 | |
| 8 | 81 | 28 | 109 | 0.1 | 66 | 665 | 731 | 13.4 | 86.2 | 0.03 | 1−(X) | 39.8 | 4.75 | |
| 9 | 88 | 28 | 116 | 0.09 | 68 | 661 | 729 | 12.6 | 94.0 | 0.02 | 1(X) | 36.1 | 6.13 | 3.1 |
| 10 | 88 | 28 | 116 | 0.07 | 57 | 679 | 736 | 12.7 | 96.5 | 0.02 | 1− | 37.5 | 6.21 | 2.5 |
| 11 | 88 | 28 | 116 | 0.06 | 62 | 658 | 720 | 12.4 | 94.3 | 0.02 | 1− | 36.8 | 6.46 | |
| 12 | 88 | 28 | 116 | 0.04 | 67 | 665 | 732 | 12.6 | 94.6 | 0.02 | 1− | 35.3 | 6.34 | 4.3 |
| 13 | 88 | 28 | 116 | 0.04 | 66 | 661 | 727 | 12.5 | 92.6 | 0.01 | 1− | 35.0 | 6.09 | |
| 14 | 88 | 28 | 116 | 0.02 | 65.8 | 665 | 730.8 | 12.6 | 97.1 | 0.02 | 1− | 42.2 | 6.29 | 5.4 |
| 15 | 88 | 28 | 116 | 0.01 | 62 | 672 | 734 | 12.7 | 95.4 | 0.02 | 1− | 31.0 | 6.42 | |
| 16 | 88 | 28 | 116 | 0.01 | 64.4 | 672 | 736.4 | 12.7 | 95.6 | 0.02 0.01 | 1− | 34.1 | 6.09 | |

The data in Table I clearly show that as the amount of butylenes in the feed was reduced the acid wash color of the cumene was correspondingly decreased. An acceptable acid wash color of one or lower was not reached until the amount of butylenes in the feed was reduced to at least about 0.1 percent by weight.

That the amount of butyl benzenes present in the alkylation product is greater than would have been predicted is apparent from Table II which is based on several period runs reported in Table I above.

TABLE II

| Period | Butyl Benzene Production, pounds per hour | |
|---|---|---|
| | Actual | Expected |
| 9 | 63 | 34 |
| 10 | 53 | 27 |
| 12 | 88 | 15 |

Note from Table II that in the periods indicated wherein such determination was made the actual amount of butyl benzenes found was at least twice in amount to the amount that would have been expected.

Obviously, many modifications and variations of the invention as hereinabove set forth, can be made without departing from the spirit and scope thereof, and therefor only such limitations should be imposed as are indicated in the appended claims.

We claim:

1. A process for obtaining cumene having an acid wash color of one or lower from a propylene stream containing at least about 0.1 percent by weight of butylenes which comprises removing butylenes from such stream so that the butylene content thereof is below about 0.02 percent by weight, subjecting benzene to alkylation with the resulting propylene stream in the presence of a phosphoric acid catalyst to obtain an alkylation product containing cumene and butyl benzene and thereafter separating said cumene from said butyl benzenes by distillation.

2. A process for obtaining cumene having an acid wash color of one or lower from a propylene stream containing at least about 0.1 percent by weight of butylenes which comprises removing butylenes from such stream so that the butylene content thereof is below about 0.02 percent by weight, subjecting benzene to alkylation with the resulting propylene stream in the presence of a phosphoric acid catalyst to obtain an alkylation product containing cumene, butyl benzenes and unreacted benzene, separating said unreacted benzene from said alkylation product and thereafter separating said cumene from said butyl benzenes by distillation.

3. A process for obtaining cumene having an acid wash color of one or lower from a propane-propylene stream containing at least about 0.1 percent by weight of butylenes which comprises removing butylenes from such stream so that the butylene content thereof is below about 0.02 percent by weight, subjecting benzene to alkylation with the resulting propane-propylene stream in the presence of a phosphoric acid catalyst to obtain an alkylation product containing cumene, butyl benzenes, unreacted benzene and propane, removing propane from said alkylation product, removing unreacted benzene from the resulting alkylation product and thereafter separating said cumene from said butyl benzenes by distillation.

4. A process for obtaining cumene having an acid wash color of one or lower from a propane-propylene stream containing at least about 0.1 percent by weight of butylenes which comprises removing butylenes from such stream so that the butylene content thereof is below about 0.02 percent by weight, subjecting benzene to alkylation with the resulting propane-propylene stream in the presence of a phosphoric acid catalyst to obtain an alkylation product containing cumene, butyl benzenes, unreacted benzene and propane, removing propane from said alkylation product, removing unreacted benzene from the resulting alkylation product and thereafter separating said cumene from said butyl benzenes by distillation.

5. A process for obtaining cumene having an acid wash color of one or lower from a propane-propylene stream containing at least about 0.1 percent by weight of butylenes which comprises removing butylenes from such stream so that the butylene content thereof is below about 0.02 percent by weight, subjecting benzene to alkylation with the resulting propane-propylene stream in the presence of a phosphoric acid catalyst to obtain an alkylation product containing cumene, butyl benzenes, unreacted benzene and propane, removing propane from said alkylation product, removing unreacted benzene from the resulting alkylation product, recycling at least a portion of said propane and said unreacted benzene and thereafter separating said cumene from said butyl benzenes by distillation.

6. A process for obtaining cumene having an acid wash color of one or lower from a propylene stream containing in excess of about 0.1 percent by weight of butylenes which comprises removing butylenes from such stream so that the butylene content thereof is below about 0.02 percent by weight, subjecting benzene to alkylation with the resulting propylene stream in the presence of a phosphoric acid catalyst at a temperature of about 350° to about 450° F. and a pressure of about 300 to about 700 pounds per square inch gauge to obtain an alkylation product containing cumene and butyl benzenes and thereafter separating said cumene from said butyl benzenes by distillation.

7. A process for obtaining cumene having an acid wash color of one or lower from a propylene stream containing in excess of about 0.1 percent by weight of butylenes which comprises removing butylenes from such stream so that the butylene content thereof is below about 0.02 percent by weight, subjecting benzene to alkylation with the resulting propylene stream in the presence of a phosphoric acid catalyst at a temperature of about 350° to about 450° F. and a pressure of about 300 to about 700 pounds per square inch gauge to obtain an alkylation product containing cumene, butyl benzenes and unreacted benzene, separating said unreacted benzene from said alkylation product and thereafter separating said cumene from said butyl benzenes by distillation.

8. A process for obtaining cumene having an acid wash color of one or lower from a propane-propylene stream containing in excess of about 0.1 percent by weight of butylenes which comprises removing butylenes from such stream so that the butylene content thereof is below about 0.02 percent by weight, subjecting benzene to alkylation with the resulting propane-propylene stream in the presence of a phosphoric acid catalyst at a temperature of about 350° to about 450° F. and a pressure of about 300 to about 700 pounds per square inch gauge to obtain an alkylation product containing cumene, butyl benzenes, unreacted benzene and propane, removing propane from said alkylation product, removing unreacted benzene from the resulting alkylation product and thereafter separating said cumene from said butyl benzenes by distillation.

9. A process for obtaining cumene having an acid wash color of one or lower from a propane-propylene stream containing in excess of about 0.1 percent by weight of butylenes which comprises removing butylenes from such stream so that the butylene content thereof is below about 0.02 percent by weight, subjecting benzene to alkylation with the resulting propane-propylene stream in the presence of a phosphoric acid catalyst at a temperature of about 350° to about 450° F. and a pressure of about 300 to about 700 pounds per square inch gauge to obtain an alkylation product containing cumene, butyl benzenes, unreacted benzene and propane, removing propane from said alkylation product, removing unreacted benzene from the resulting alkylation product and thereafter separating said cumene from said butyl benzenes by distillation.

10. A process for obtaining cumene having an acid wash color of one or lower from a propane-propylene stream containing in excess of about 0.1 percent by weight of butylenes which comprises removing butylenes from such stream so that the butylene content thereof is below about 0.02 percent by weight, subjecting benzene to alkylation with the resulting propane-propylene stream in the presence of a phosphoric acid catalyst at a temperature of about 350° to about 450° F. and a pressure of about 300 to about 700 pounds per square inch gauge to obtain an alkylation product containing cumene, butyl benzenes, unreacted benzene and propane, removing propane from said alkylation product, removing unreacted benzene from the resulting alkylation product, recycling at least a portion of said propane and said unreacted benzene and thereafter separating said cumene from said butyl benzenes by distillation.

References Cited

UNITED STATES PATENTS 2,393,895  1/1946  Fleming _____ 260—671
2,408,753  10/1946  Burk _____ 260—671
3,277,196  10/1966  Winkler _____ 260—671

FOREIGN PATENTS 758,571  10/1956  Great Britain.

DELBERT E. GANTZ, *Primary Examiner.*

PAUL M. COUGHLAN, JR., *Examiner.*

C. R. DAVIS, *Assistant Examiner.*

UNITED STATES PATENT OFFICE

CERTIFICATE OF CORRECTION

Patent No. 3,381,049                                        April 30, 1968

Andrew Alexander et al.

It is certified that error appears in the above identified patent and that said Letters Patent are hereby corrected as shown below:

Columns 3 and 4, TABLE I, eleventh column, after line 16, cancel "0.01"; same TABLE I, heading to the last column, "Butyl wt. Percent" should read -- Butyl Benzene wt. Percent --.

Signed and sealed this 28th day of October 1969.

(SEAL)
Attest:

Edward M. Fletcher, Jr.                          WILLIAM E. SCHUYLER, JR.
Attesting Officer                                          Commissioner of Patents